United States Patent
Gurumurthi et al.

(10) Patent No.: US 12,013,752 B2
(45) Date of Patent: Jun. 18, 2024

(54) HOST-LEVEL ERROR DETECTION AND FAULT CORRECTION

(71) Applicant: ADVANCED MICRO DEVICES, INC., Santa Clara, CA (US)

(72) Inventors: Sudhanva Gurumurthi, Austin, TX (US); Vilas Sridharan, Boston, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/841,864

(22) Filed: Jun. 16, 2022

(65) Prior Publication Data

US 2023/0409426 A1  Dec. 21, 2023

(51) Int. Cl.
  *G06F 11/10* (2006.01)
  *G06F 11/07* (2006.01)

(52) U.S. Cl.
  CPC ...... *G06F 11/1004* (2013.01); *G06F 11/0772* (2013.01); *G06F 11/102* (2013.01); *G06F 11/1068* (2013.01)

(58) Field of Classification Search
  CPC ............. G06F 11/1004; G06F 11/0772; G06F 11/102; G06F 11/1068
  See application file for complete search history.

(56) References Cited

U.S. PATENT DOCUMENTS

| | | | | |
|---|---|---|---|---|
| 4,692,893 A | * | 9/1987 | Casper | G06F 11/1076 714/48 |
| 5,922,080 A | * | 7/1999 | Olarig | G06F 11/1008 714/E11.049 |
| 6,594,785 B1 | * | 7/2003 | Gilbertson | G06F 11/0712 714/48 |
| 9,535,804 B2 | * | 1/2017 | Kaplan | G06F 11/1076 |
| 11,200,119 B2 | * | 12/2021 | Meaney | G11C 29/025 |

(Continued)

FOREIGN PATENT DOCUMENTS

| | | |
|---|---|---|
| CN | 105788648 | 7/2016 |
| CN | 110727543 | 1/2020 |
| WO | WO-2022139849 A1 * | 6/2022 |

OTHER PUBLICATIONS

Nair et al., "XED: Exposing On-Die Error Detection Information for Strong Memory Reliability", ISCA 2016, 13 pages.

(Continued)

*Primary Examiner* — Matthew M Kim
*Assistant Examiner* — Indranil Chowdhury

(57) ABSTRACT

A processing system includes a processing device coupled to a memory configured to check for and correct faults in requested data. In response to correcting the faults of the requested data, the memory sends the corrected data and unused check bits to the processing device as a plurality of fetch returns. The memory also sends a parity fetch based on the corrected data and one or more operations to the processing device. After receiving the plurality of fetch returns and the unused check bits, the processing device checks each fetch return for faults based on the unused check bits. In response to determining that a fetch return includes a fault, the processing device erases the fetch return and reconstructs the fetch return based on one or more other received fetch returns and the parity fetch.

20 Claims, 7 Drawing Sheets

(56) References Cited

U.S. PATENT DOCUMENTS

| | | | |
|---|---|---|---|
| 2010/0162065 A1* | 6/2010 | Norman | G11C 5/02 |
| | | | 714/E11.002 |
| 2012/0159283 A1 | 6/2012 | Lu et al. | |
| 2014/0068379 A1* | 3/2014 | Sakaue | G06F 11/1012 |
| | | | 714/764 |
| 2015/0019933 A1* | 1/2015 | Yamazaki | G06F 11/108 |
| | | | 714/758 |
| 2017/0060680 A1 | 3/2017 | Halbert et al. | |
| 2018/0018233 A1* | 1/2018 | Kim | G06F 11/1096 |
| 2018/0131394 A1* | 5/2018 | Yokokura | H03M 13/2906 |
| 2018/0210787 A1* | 7/2018 | Bains | G11C 11/409 |
| 2018/0219562 A1* | 8/2018 | Lee | H03M 13/098 |
| 2019/0108147 A1* | 4/2019 | Dropps | G06F 11/1012 |
| 2019/0227886 A1* | 7/2019 | Glancy | G11C 29/44 |
| 2020/0356438 A1* | 11/2020 | Kim | G06F 3/0679 |
| 2021/0049062 A1* | 2/2021 | Balakrishnan | G06F 11/1048 |
| 2021/0149763 A1* | 5/2021 | Ranganathan | G06F 11/1064 |
| 2021/0216401 A1 | 7/2021 | Meaney et al. | |
| 2021/0295941 A1* | 9/2021 | Asami | G11C 16/10 |
| 2022/0014213 A1* | 1/2022 | Lu | H03M 13/1174 |
| 2022/0108762 A1* | 4/2022 | Jang | G11C 7/1057 |
| 2022/0171671 A1* | 6/2022 | Singh | G06F 21/79 |
| 2024/0040014 A1* | 2/2024 | Shribman | H04L 67/59 |

OTHER PUBLICATIONS

Jeon et al., "Efficient RAS Support for 3D Die-Stacked DRAM", IEEE International Test Conference, 2014, 12 pages.
Gurumurthi et al., "HBM3 RAS: Enhancing Resilience at Scale", IEEE Computer Architecture Letters, vol. 20, No. 4, 2021, 4 pages.
High Bandwidth Memory DRAM (HBM3), JESD238, JEDEC Solid State Technology Association, Jan. 2022, 268 pages.
International Search Report and Written Opinion mailed Nov. 22, 2023 for PCT/US2023/025428, 10 pages.

\* cited by examiner

HOST-LEVEL ERROR DETECTION AND FAULT CORRECTION

BACKGROUND

In memory structures, data stored in the memory banks of the memory layers can include uncorrected errors due to corruption of the stored data. To detect and correct these errors, some memory structures implement on-die error correction codes that generate check bits for the stored data. As data is read out of the memory banks, these memory structures detect and correct errors in the data by using the generated check bits. However, even with such on-die error correction, faults not bound to a set number of bits in the data still occur when the data is read out to a processing system. Such unbounded faults decrease the reliability of the processing system as the unbounded faults can cause the processing system to fail, resulting in a field replacement unit event. These field replacement unit events require the replacement of one or more components of the processing system, thus increasing the cost to maintain the processing system.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
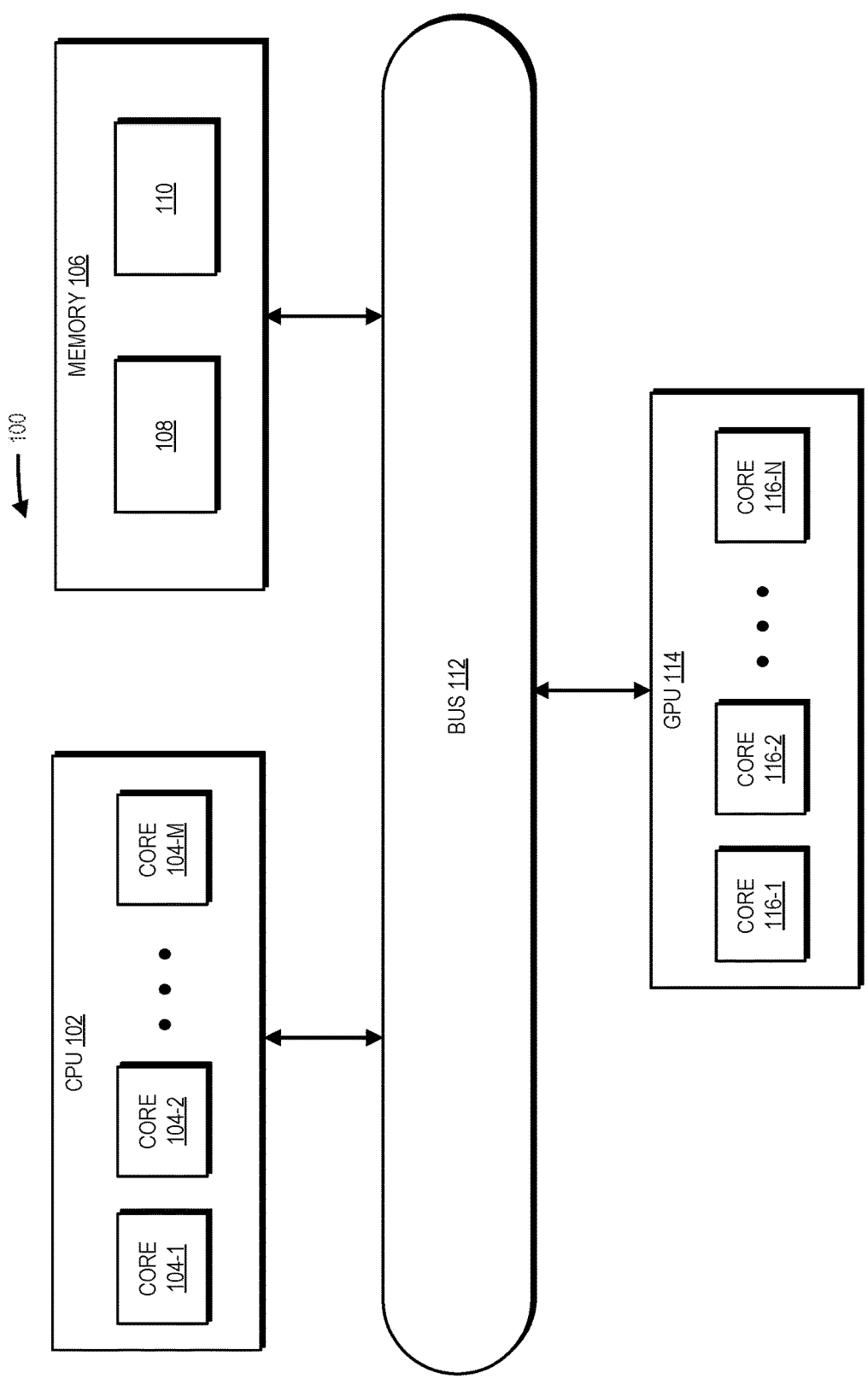
FIG. 1 is a block diagram of a processing system for host-level error detection and correction, in accordance with some embodiments.

Techniques and systems described herein address providing host-level error detection and correction in a processing system. Using the techniques disclosed herein, a processor executes error detection for each fetch return of a set of fetch returns from a memory based one or more check bits provided from the memory. The set of fetch returns, for example, collectively correspond to a cacheline read out of the memory. In response to detecting an error in one of the fetch returns (referred to, for example, as a faulty return), the processor reconstructs the data for the faulty return from the other fetch returns in the set and an extra parity fetch provided by the memory. The processor thereby improves error correction for fetched data, and thus enhances overall reliability of a processing system.

To illustrate the techniques and systems, a processing system includes one or more processing devices (e.g., CPUs, GPUs) communicatively coupled to a memory configured to implement one or more error correction codes (ECCs) such that one or more portions of the data stored in the memory (e.g., a stored cacheline) are associated with one or more check bits. A processing device of the processing system generates a set of fetch portions identifying data to be read out of the memory and provides them to the memory. In response to receiving the set of fetch portions, the memory is configured to read out the data identified in fetch portions, check the read-out data for one or more faults (e.g., driver faults, bank faults), and correct one or more detected faults. The memory checks for and corrects faults in the read-out data using one or more check bits associated with the read-out data. The memory then sends the corrected data and one or more unused check bits associated with the read-out data (e.g., check bits not used in detecting or correcting faults) to the processing device as a set of fetch returns. Additionally, the memory sends an additional parity fetch that includes data resulting from performing one or more operations on the fetch returns, for example on the data included in the fetch returns. In response to receiving the fetch returns, the processing device is configured to detect faults in the received fetch returns using the unused check bits. After detecting a fault in a received fetch return, the processing device erases the fetch return and reconstructs the fetch return using the data in one or more other received fetch returns and the parity fetch. In this way, any detected fault isolated to a single fetch return is corrected, increasing the reliability of the processing system by improving the detection and correction of such faults. As such, the chance for a field replacement unit event, the termination of applications using the memory, system reboot, or any combination thereof occurring for the system is reduced helping to reduce the costs in maintaining the system.

Additionally, the processing device is configured to generate a set of write portions identifying data to be written to the memory. The set of write portions corresponds, for example, to a cacheline to be written to memory. Based on the set of write portions, the processing device is also configured to generate a write parity that includes data resulting from performing one or more operations on the data identified in the write portions. The processing device then generates a respective check value for each write portion and the write parity based on an ECC implemented by the processing device. After generating the check values, the write portions, check values, and write parity are sent to and stored in the memory. In this way, the reliability of the data written to the memory is increased. For example, in response to one or more errors being detected in the data written to the memory, the data is rebuilt using other data stored in the memory and the data of the write parity. As such, the likelihood of a field replacement unit event, the termination of applications using the memory, system reboot, or any combination thereof is reduced as the reliability of the data is increased.

FIG. 1 is a block diagram of a processing system 100 for high memory bandwidth host error correction, according to some embodiments. The processing system 100 includes or has access to a memory 106 or other storage component implemented using a non-transitory computer-readable medium, for example, a dynamic random-access memory (DRAM), static random access memory (SRAM), nonvolatile RAM, or any combination thereof, to name a few. In embodiments, memory 106 includes a three-dimensional (3D) stacked synchronous dynamic random-access memory (SDRAM) having one or more memory layers that each have one or more memory banks, memory subbanks, or both. Memory 106 includes an interface that includes hardware and software configured to communicatively couple memory 106 to one or more portions of processing system 100, for example, a High Bandwidth Memory (HBM) interface, a second-generation High Bandwidth Memory (HBM2) interface, a third-generation High Bandwidth Memory (HBM3) interface, or the like. According to embodiments, memory 106 is external to the processing units implemented in the processing system 100 while in other embodiments memory 106 is internal to the processing units impltement in the processing system 100. The processing system 100 also includes a bus 112 to support communication between entities implemented in the processing system 100, for example central processing unit (CPU) 102 and graphics processing unit (GPU) 114. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, CPUs, GPUs, general-purpose GPUs (GPGPUs), non-scalar processors, highly-parallel processors, artificial intelligence (AI) processors, inference engines, machine learning processors, other multithreaded processing units, and the like), scalar processors, serial processors, or any combination thereof. FIG. 1 illustrates an example of a parallel processor and in particular GPU 114, in accordance with some embodiments. The GPU 114 renders images for presentation on a display 120. For example, the GPU 114 renders objects to produce values of pixels that are provided to the display 120, which uses the pixel values to display an image that represents the rendered objects. The GPU 114 implements a plurality of processor cores 116-1 to 116-N that execute instructions concurrently or in parallel. According to embodiments, one or more processor cores 116 operate as single instruction, multiple data (SIMD) units that perform the same operation on different data sets. Though in the example embodiment illustrated in FIG. 1, three cores (116-1, 116-2, 116-N) are presented representing an N number of cores, the number of processor cores 116 implemented in the GPU 114 is a matter of design choice. As such, in other embodiments, the GPU 114 can include any number of cores 116. Some embodiments of the GPU 114 are used for general-purpose computing. The GPU 114 executes instructions such as program code 108 stored in the memory 106 and the GPU 114 stores information in the memory 106 such as the results of the executed instructions.

The processing system 100 also includes CPU 102 that is connected to the bus 112 and therefore communicates with the GPU 114 and the memory 106 via the bus 112. The CPU 102 implements a plurality of processor cores 104-1 to 104-N that execute instructions concurrently or in parallel. In embodiments, one or more of the processor cores 104 operate as SIMD units that perform the same operation on different data sets. Though in the example embodiment illustrated in FIG. 1, three cores (104-1, 104-2, 104-M) are presented representing an M number of cores, the number of processor cores 104 implemented in the CPU 102 is a matter of design choice. As such, in other embodiments, the CPU 102 can include any number of cores 104. In some embodiments, the CPU 102 and GPU 114 have an equal number of cores 104, 116 while in other embodiments, the CPU 102 and GPU 114 have a different number of cores 104, 116. The processor cores 104 execute instructions such as program code 110 stored in the memory 106 and the CPU 102 stores information in the memory 106 such as the results of the executed instructions. The CPU 102 is also able to initiate graphics processing by issuing draw calls to the GPU 114. In embodiments, the CPU 102 implements multiple processor cores (not shown in FIG. 1 in the interest of clarity) that execute instructions concurrently or in parallel.

In embodiments, CPU 102, GPU 114, or both, are configured to generate and send a fetch request (e.g., cacheline fetch) to memory 106. For example, CPU 102, GPU 114, or both are configured to generate a load or read operation requesting data (e.g., a cacheline) from memory 106. The fetch request identifies and requests data, for example, necessary for, aiding in, or helpful for one or more instructions executed at the CPU 102, GPU 114, or both. That is to say, the fetch request identified and requests data for a read or load operation. In response to receiving the fetch request, memory 106 is configured to read out and provide the data identified in the fetch request to CPU 102, GPU 114, or both. According to embodiments, CPU 102, GPU 114, or both are configured to divide a fetch request into two or more fetch portions that each include data representing at least a portion of the fetch request. For example, CPU 102, GPU 114, or both are configured to divide a fetch request into two or more fetch portions each representing a distinct portion of the requested data identified in the fetch request. In embodiments, each resulting fetch portion is equal in size. As an example, CPU 102, GPU 114, or both are configured to divide a 128-bit fetch request (i.e., a fetch request identifying 128 bits of requested data) into four fetch portions each representing a distinct 32-bit portion of the fetch request. In response to receiving a fetch portion, memory 106 is configured to read out and provide a corresponding fetch return that includes data identified in the fetch portion to CPU 102, GPU 114, or both.

In embodiments, CPU 102, GPU 114, or both are configured to generate and send a write request (e.g., cache line write request) to memory 106. The write request identifies data to be written to one or more portions of memory 106 from one or more caches included in or otherwise communicatively coupled to CPU 102, GPU 114, or both. In response to receiving the write request, memory 106 is configured to write the data identified in the write request to one or more portions of memory 106. In embodiments, CPU 102, GPU 114, or both are configured to divide a write request into four write portions each representing a distinct portion of the data identified in the write request. In response to receiving a write portion, memory 106 is configured to write the data identified in the write portion to one or more portions of memory 106.

According to embodiments, CPU 102, GPU 114, or both are configured to generate a parity request in response to generating one or more fetch portions from a fetch request. That is to say, CPU 102, GPU 114, or both generate a parity request when dividing a fetch request into one or more fetch portions. The parity request identifies each fetch portion and one or more operations to be performed. For example, the parity request identifies one or more operations to be performed on the data identified in each fetch portion. In response to receiving the parity request, memory 106 is configured to generate and return a parity fetch to CPU 102, GPU 114, or both. The parity fetch includes data resulting from performing the operations identified in the parity request on the data identified in one or more fetch requests. As an example, in response to receiving a parity request identifying a XOR operation and four fetch portions each indicating a portion of data (e.g., D0, D1, D2, D3), memory 106 is configured to generate a parity fetch that includes the data resulting from performing a XOR operation on the data from each fetch return (e.g., D0⊕D1⊕D2⊕D3). Similarly, in embodiments, CPU 102z, GPU 114, or both are configured to generate a write parity in response to generating one or more write portions from a write request. That is to say, CPU 102, GPU 114, or both generate a write parity when dividing a write request into one or more write portions. The write parity includes data resulting from performing one or more operations on the write portions. That is to say, data resulting from performing one or more operations on the data identified in the write portions divided from the write request. As an example, in response to dividing a write request into four write portions each identifying a portion of data (e.g., W0, W1, W2, W3), CPU 102, GPU 114, or both are configured to generate a write parity including data resulting from performing a XOR operation on the data from each write portion (e.g., W0⊕W1⊕W2⊕W3). In response to receiving a write parity, memory 106 is configured to store the data of the write parity in one or more portions of memory 106.

According to embodiments, memory 106 is configured to implement one or more one or more error correction codes (ECCs) for the data stored in memory 106. For example, in response to receiving a request to store data (e.g., a write request) in memory 106, memory 106 is configured to implement one or more ECCs such that one or more check bits are generated for the data to be stored. In response to generating the check bits, memory 106 stores the memory and the check bits in at least a portion of the memory 106. Such ECCs include, for example, on-die ECCs, single-error correction (SEC) codes, symbol-based codes (e.g., Reed-Solomon codes), cyclic redundancy check (CRC) codes, longitudinal redundancy check (LRC) codes, check sum codes, parity check codes, Hamming Codes, binary convolution codes, or any combination thereof, to name a few. As an example, for every 128 bits stored in memory 106 (e.g., a cacheline), memory 106 is configured to generate 32 check bits and store the check bits in at least a portion of memory 106. In response to receiving one or more fetch portions, memory 106 is configured to read out the data identified in the received fetch portions and implement the ECCs such that one or more faults are detected and corrected in the read-out data. According to some embodiments, memory 106 is configured to detect and correct faults in the read-out data bounded to a predetermined number of bits. That is to say, faults limited to respective portions of the read-out data each including the predetermined number of bits. For example, memory 106 is configured to detect and correct faults bounded to 16-bit portions of the read-out data. Memory 106 is configured to detect and correct faults by, for example, comparing the check bits associated with the read-out data to one or more values (e.g., thresholds, values, strings), performing one or more operations on the check bits associated with the data, or both. In response to detecting, correcting, or both one or more faults, memory 106 is configured to generate a fetch return using the corrected data and send the fetch return to CPU 102, GPU 114, or both. In embodiments, in response to memory 106 detecting and correcting faults in the read-out data bounded to a predetermined number of bits, one or more check bits associated with the read-out data are left unused. That is to say in response to memory 106 detecting and correcting faults bounded to a predetermined number of bits, not every check bit associated with the read-out data is used to detect and correct errors in the read-out data such that one or more unused check bits remain. As an example, in response to memory 106 detecting and correcting faults in the read-out data bounded to 16-bit portions of the read-out data, only 16 check bits of 32 check bits associated with the read-out data are necessary to detect and correct faults in the 16-bit portions. As such, only 16 of the check bits are used such that 16 unused check bits remain.

According to embodiments memory 106 is configured to send one or more unused check bits to CPU 102, GPU 114, or both along with one or more fetch returns. For example, in response to receiving a set of fetch portions identifying requested data (e.g., a cacheline), memory 106 is configured to send a set of fetch returns including the read-out requested data and one or more unused check bits to CPU 102, GPU 114, or both. In some embodiments, memory 106 is configured to add one or more unused check bits associated with the data in a fetch return to each fetch return while in other embodiments, memory 106 send the unused check bits separately from the fetch returns. For example, memory 106 is configured to add unused check bits associated with the read-out data in a fetch return to the fetch return such that the fetch return includes the read-out data identified in a respective fetch portion and one or more unused check bits. The unused check bits include, for example, metadata related to the fetch return that indicates, for example, an error status of the fetch portion. As an example, in response to receiving a set of 32-bit fetch portions (i.e., fetch portion identifying 32 bits of request data) corresponding to a fetch request (e.g., a requested cacheline), memory 106 is configured to provide a set of fetch returns that each include 32-bits of read-out data identified in a respective fetch portion and 16 unused check bits (e.g., check bits not used to detect or correct errors in the data of the fetch returns). In response to receiving a fetch return, CPU 102, GPU 114, or both are configured to implement one or more ECCs to detect one or more faults in the received fetch returns. Such ECCs include, for example, CRC codes (e.g., CRC-9, CRC-12, CRC-16), symbol-based codes, LRC codes, check sum codes, parity check codes, Hamming Codes, binary convolution codes, or any combination thereof, to name a few. For example, CPU 102, GPU 114, or both are configured to implement a CRC-12 code for each fetch return. In embodiments, CPU 102, GPU 114, or both, are configured to detect one or more faults in a fetch return using one or more unused check bits associated with the fetch return (e.g., included in the fetch returns, returned with the fetch return, or both) according to one or more ECCs implemented by CPU 102, GPU 114, or both. To this end, CPU 102, GPU 114, or both are configured to detect faults in a fetch return by, for example, comparing one or more unused check bits associated with the fetch return to one or more values (e.g., thresholds, values, strings), performing one or more operations on one or more unused check bits associated with the fetch return according to an implemented ECC, or both. As an example, to detect one or more faults in a fetch return, CPU 102, GPU 114, or both are configured to perform one or more operations on one or more unused check bits associated with a fetch return according to a CRC-12 implemented by CPU 102, GPU 114, or both.

In response to detecting one or more faults in a fetch return, CPU 102, GPU 114, or both are configured to correct the detected faults. CPU 102, GPU 114, or both are configured to correct detected faults by, for example, erasing the fetch return including one or more faults and reconstructing the erased fetch return. That is to say, in response to detecting one or more faults in a fetch return, CPU 102, GPU 114, or both are configured to erase the fetch return. After erasing a fetch return, CPU 102, GPU 114, or both are configured to reconstruct the erased fetch return from other received fetch returns and the parity fetch. For example, CPU 102, GPU 114, or both are configured to reconstruct the erased fetch return by performing a XOR operation on the data in the other received fetch returns and the parity fetch. In this way, any fault isolated to a single fetch return (e.g., wordline driver faults, bank faults) is corrected. By correcting faults in this way, the detection coverage and correction of faults for the system is improved, increasing the reliability of the system. As such, the chance for a field replacement unit event, the termination of applications using the memory, system reboot, or any combination thereof occurring for the system is reduced.

In embodiments, CPU 102, GPU 114, or both are configured to implement one or more ECCs so as to generate one or more check values for each write portion and write parity generated by CPU 102, GPU 114, or both. Such ECCs include, for example, CRC codes (e.g., CRC-9, CRC-12, CRC-16), symbol-based codes, LRC codes, check sum codes, parity check codes, Hamming Codes, binary convolution codes, or any combination thereof, to name a few. For example, CPU 102, GPU 114, or both are configured to implement a CRC-12 code for each write portion and write parity such that a 12-bit check value is generated for each write portion and a write parity associated with the write portions. According to embodiments, the respective check value generated for each write portion is included in the write portion when it is sent to memory 106 and the respective check value for each write parity is included in the write parity when it is sent to memory 106. As such, in response to receiving a write portion, memory 106 is configured to store the data identified in the write portion or write parity and the check value in one or more portions of memory 106. In this way, the reliability of the data written to the memory is increased. For example, in response to one or more errors being detected in the data written to the memory, the data is rebuilt using other data stored in the memory and the write parity which increases the reliability of the system.

Figure 2:
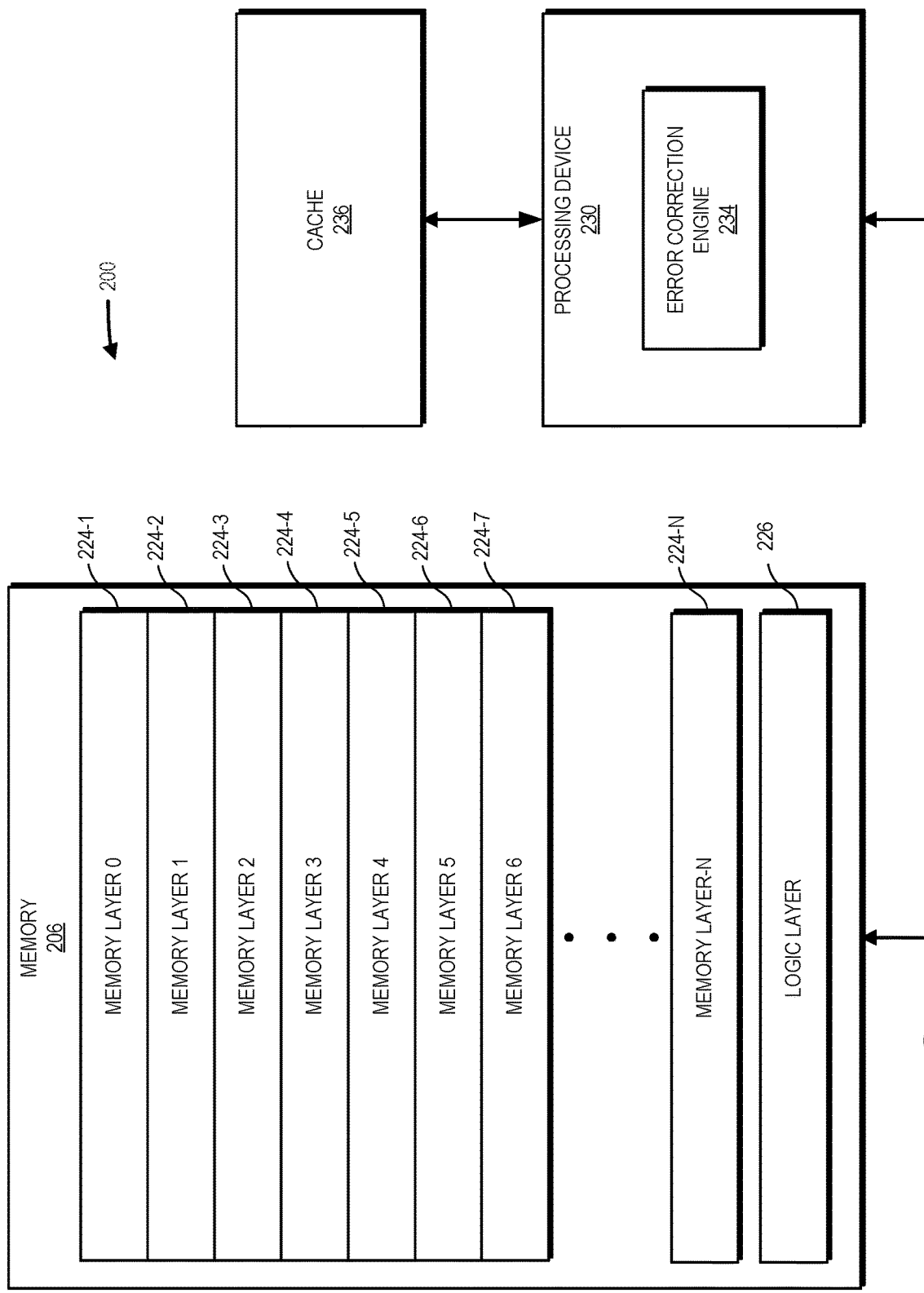
FIG. 2 is a block diagram of a processing system for host-level error detection and correction with a stacked memory, in accordance with some embodiments.

Referring now to FIG. 2, a block diagram of a processing system 200 for host-level error detection and correction is presented. Processing system 200 includes a processing device 230, similar to or the same as CPU 102, GPU 114, or both communicatively coupled to a cache 236 and memory 206, similar to or the same as memory 106. Cache 236 comprises, for example, one or more private caches, shared caches, or both included in or otherwise communicatively coupled to processing device 230. According to embodiments, processing system 200 is disposed in a single package with at least memory 206 and processing device 230 disposed on a same substrate (not shown for clarity) of the package. In embodiments, processing device 230 and memory 206 are communicatively coupled by a silicon interposer disposed on the substrate.

Memory 206 includes one or more stacked memory layers 224 each including one or more memory banks, memory subbanks, or both. For example, memory 206 includes a 3D-stack SDRAM having one or more memory layers 224 each including one or more memory banks. Though the example embodiment illustrated in FIG. 2 presents memory 206 having eight memory layers (224-1, 224-2, 224-3, 224-4, 224-5, 224-6, 224-7) representing an N number of memory layers, in other embodiments, memory 206 may have any number of memory layers 224. According to embodiments, each memory layer 224 includes two channels, for example, two 64-bit channels, configured to allow the access, modification, and deletion of the data stored in the memory banks, memory subbanks, or both of the memory layer 224. As an example, each channel of a memory layer 224 is configured to allow the access, modification, and deletion of data in a distinct memory bank or memory subbank of the memory layer 224. In some embodiments, memory 206 is configured to operate each channel as two or more pseudo channels such that each pseudo channel of a channel allows for the access, modification, and deletion of data in a distinct portion of the memory bank or memory subbank associated with the channel. For example, memory 206 is configured to operate a 64-bit channel as two 32-bit pseudo channels each configured to allow for the access, modification, and deletion of data in a distinct portion of the memory bank or memory subbank associated with the 64-bit channel.

In embodiments, the memory layers 224 include one or more silicon memory dies stacked on top of one another. That is to say, each memory layer 224 includes a silicon memory die and the dies of each memory layer 224 are arranged so as to form a stack of memory dies. According to embodiments, one or more through silicon vias (TSVs) (not shown for clarity) run through one or more memory layers 224 of the stack so as to communicatively couple one or more memory layers 224. To control data stored in the memory layers 224 of memory 206, memory 206 includes logic layer 226 that includes hardware and software configured to access, modify, and delete data in the memory banks and memory sub-bands of the memory layers 224. For example, logic layer 226 includes one or more memory controllers each configured to access, modify, and delete data in the memory banks and memory sub-bands of one or more memory layers 224. In embodiments, logic layer 226 is communicatively coupled to each memory layer 224 by, for example, one or more TSVs.

According to embodiments, logic layer 226 is configured to store data in one or more memory banks, memory subbanks, or both of one or more memory layers 224. For example, logic layer 226 includes one or more memory controllers each associated with a memory bank or memory subbank and configured to store data in its associated memory bank or subbank. In embodiments, logic layer 226 is configured to implement one or more ECCs (e.g., CRC codes (e.g., CRC-9, CRC-12, CRC-16), symbol-based codes, LRC codes, check sum codes, parity check codes, Hamming Codes, binary convolution codes) for data being written to one or more data banks or data subbanks of memory 206. Logic layer 226 is configured to implement the ECCs such that one or more check bits are generated for a predetermined amount of data written to one or more memory banks or memory subbanks. For example, logic layer 226 is configured to implement an on-die ECC such that 32 check bits are generated for every 256 bits of data stored. As another example, logic layer 226 is configured to implement an on-die ECC such that one check bit is generated for every byte of data stored. In response to generating one or more check bits, logic layer 226 is configured to store the check bits in, for example, the same memory bank or memory subbank assigned to hold the data being written (i.e., the data used to generate the check bits).

In embodiments, processing device 230 is configured to generate one or more fetch requests (e.g., cache line requests) requesting data stored in one more memory layers 224 of memory 206. For example, processing device 230 generates a fetch request requesting 128 bits of data from memory 206. Processing device 230 is further configured to divide a fetch request into a set of fetch portions including one or more fetch portions that each identifies at least a portion of the data requested by the fetch request. For example, processing device 230 is configured to divide a 128-bit fetch request (i.e., a fetch request identifying 128 bits of requested data) into a set of four 32-bit fetch portions each identifying a distinct 32-bit portion of the data requested in the 128-bit fetch request. According to embodiments, processing device 230 is configured to divide a fetch request into one or more fetch portions based on the channels of memory 206. For example, in response to memory 206 having two 64-bit channels per memory layer 224, processing device 230 is configured to divide a 128-bit fetch request into two 64-bit fetch portions. As another example, in response to memory 206 having two 64-bit channels operating in a pseudo channel mode (e.g., having two 32-bit pseudo channels per channel), processing device 230 is configured to divide a 128-bit fetch request into four 32-bit fetch portions. After dividing a fetch request into one or more fetch portions, processing device 230 is configured to send the fetch portions to logic layer 226 of memory 206. According to embodiments, in response to dividing a fetch request into one or more fetch portions, processing device 230 is configured to generate a parity request identifying each fetch portion and one or more operations to be performed on the data identified in the fetch portions. For example, the parity request identifies four fetch portions and a XOR operation to be performed on the data identified in each fetch portion. After generating the parity request, processing device 230 is configured to send the parity request with the fetch portions to logic layer 226.

In response to receiving the fetch portions and the parity request, logic layer 226 is configured to read out the data identified in the fetch portions from one or more memory layers 224 and determine if one or more faults are present in the read-out data. To determine if one or more faults are present in the read-out data, logic layer 226 checks the read-out data according to the ECC implemented by logic layer 226. For example, logic layer 226 checks the data read out of a data subbank of a memory layer 224 for faults according to an on-die ECC implemented by logic layer 226. In embodiments, logic layer 226 is configured to determine if one or more faults are present in the read-out data by, for example, comparing one or more check bits associated with the read-out data to one or more values (e.g., thresholds, values, strings), performing one or more operations on the check bits associated with the read-out data according to an implemented ECC, or both. For example, logic layer 226 is configured to compare, as an example, 16 check bits associated with read-out data to one or more values to determine the presence of one or more faults in the read-out data. According to embodiments, logic layer 226 is configured to detect and correct faults bounded to a predetermined number of bits in the read-out data. That is to say, faults limited to respective portions of the read-out data each including the predetermined number of bits. For example, logic layer 226 is configured to detect and correct faults bounded to 16-bit portions of the read-out data. In response to determining one or more faults in the read-out data, logic layer 226 is configured to correct one or more of the detected errors based on one or more check bits associated with the requested data, data stored in one or more memory layers 224 of memory 206, one or more parity bits, or any combination thereof. According to embodiments, logic layer 226 is configured to use only a portion of the check bits associated with the read-out data when detecting and correcting faults bounded to a predetermined number of bits in the read-out data such that one or more unused check bits remain. For example, logic layer 226 is configured to use 16 check bits of 32 total check bits to detect and correct faults in the read-out data bounded to 16 bits such that 16 unused check bits remain.

After correcting the requested data, logic layer 226 is configured to generate a set of fetch returns including one or more fetch returns that each includes corrected read-out data associated with a respective received fetch portion (e.g., corrected read-out data identified by a respective fetch portion). For example, in response to receiving four 32-bit fetch portions (i.e., fetch portions each identifying 32 bits of requested data), logic layer 226 is configured to generate a set of four 32-bit fetch returns each including corrected data identified in a respective 32-bit fetch portion. After generating the fetch returns, logic layer 226 is configured to generate a parity fetch based on a received parity request. As an example, logic layer 226 is configured to perform one or more operations identified in a received parity request on the corrected data in each generated fetch return. For example, in response to receiving a parity request identifying a XOR operation and generating four fetch returns each including a portion of read-out data (e.g., D0, D1, D2, and D3), logic layer 226 is configured to perform a XOR operation on the read-out data in the generated fetch returns (e.g., D0⊕D1⊕D2⊕D3) to generate a parity fetch. In response to generating the parity fetch, logic layer 226 is configured to send the generated fetch returns and parity fetch to processing device 230. According to embodiments, in response to generating the parity fetch, logic layer 226 is further configured to send one or more unused check bits to processing device 230. For example, logic layer 226 is configured to include one or more unused check bits in one or more fetch returns, send one or more unused check bits separately from the fetch returns and parity fetch, or a combination of the two. As an example, in response to generating the parity fetch, logic layer 226 is configured to send a set of fetch returns, the parity fetch, and one or more unused check bits to processing device 230.

Processing device 230 includes error correction engine 234 that includes hardware and software configured to implement one or more ECCs (e.g., CRC codes (e.g., CRC-9, CRC-12, CRC-16), symbol-based codes, LRC codes, check sum codes, parity check codes, Hamming Codes, binary convolution codes) for fetch returns received by processing device 230 and write requests (e.g., write portions) generated by processing device 230. In response to processing device 230 receiving one or more fetch returns and one or more parity fetches, error correction engine 234 is configured to check each fetch return for one or more faults based on the implemented ECCs. For example, error correction engine 234 is configured to check each fetch return for faults based on a CRC-12 code. In embodiments, error correction engine 234 is configured to used one or more unused check bits of a fetch return to determine if the fetch return includes one or more faults (e.g., uncorrected errors). For example, error correction engine 234 compares one or more unused check bits of a fetch return to one or more values (e.g., thresholds, values, strings), performs one or more operations on the unused check bits of a fetch return, or both to determine if the fetch return contains one or more faults. In response to a fetch return having one or more faults (e.g., uncorrected errors), error correction engine 234 is configured to erase and reconstruct the fetch return. Error correction engine 234 is configured to reconstruct a fetch return based on one or more other fetch returns, a parity fetch, or both. For example, error correction engine 234 is configured to reconstruct a fetch return based on the data in each other fetch return returned with the fetch return and the data in a parity fetch returned with the fetch return. By reconstructing fetch returns using the parity fetch, the detection coverage and correction of faults for the system are improved, increasing the reliability of the system. As such, the chance for a field replacement unit event, the termination of applications using the memory, system reboot, or any combination thereof occurring for the system is reduced. After reconstructing the data in the return fetch, the reconstructed return fetch and each other fetch return returned with the fetch return are stored in cache 236. For example, the return fetches are provided to a data fabric (not shown for clarity) communicatively coupled to processing device 230 and cache 236.

According to embodiments, processing device 230 is configured to generate one or more write requests identifying data to be written to one or more portions of memory 206. For example, processing device 230 is configured to generate a write request identifying data in cache 236 to be written to one or more memory layers 224 of memory 206. In embodiments, processing device 230 is configured to divide a write request into one or more write portions with each write portion identifying a distinct portion of the data identified in the write request. For example, processing device 230 is configured to divide a write request into one or more write portions based on the size of the channels of memory 206. As an example, in response to each memory layer 224 having two 64-bit channels, processing device 230 is configured to divide a 128-bit write request into two 64-bit write requests. As another example, in response to each memory layer 224 having two channels operating in a pseudo channel mode (e.g., each channel has two pseudo channels), processing device 230 is configured to divide a 128-bit write request into four 32-bit write requests. In embodiments, in response to generating one or more write portions, processing device 230 is configured to generate a write parity that includes data resulting from performing one or more operations on the data identified in one or more write portions. For example, a write parity includes data resulting from performing a XOR operation on the data identified in four write portions divided from a write request.

According to embodiments, error correction engine 234 is configured to generate one or more check values for the data identified in each write portion and each write parity based on the ECCs implemented by error correction engine 234. For example, error correction engine 234 is configured to generate 12-bit check values for the data identified in each write portion and write parity based on a CRC-12 code implemented by error correction engine 234. After generating the check values, each check value is added to its respective write portion or write parity. That is to say, each write portion includes data identifying data to be written to memory 206 and a check value and each write parity includes data resulting from performing one or more operations on the data to be written and a check value. In response to the check values being added to the write portions and the write parity, the write portions and the write parity are sent to logic layer 226 of memory 206. In response to receiving one or more write portions and the write parity, logic layer 226 is configured to store the data identified in the write portions, the data of the write parity, and the check values in one or more memory layers 224. For example, logic layer 226 is configured to store the data identified in a write portion and the check value of the write portion to a memory subbank of a memory layer 224. By storing the write portions with check values and the write parity, the reliability of the data written to the memory is increased. For example, in response to one or more errors being detected in the data written to the memory, the data is rebuilt using other data stored in the memory and the write parity which reduces the likelihood of a field replacement unit event, the termination of applications using the memory, system reboot, or any combination thereof.

Figure 3:
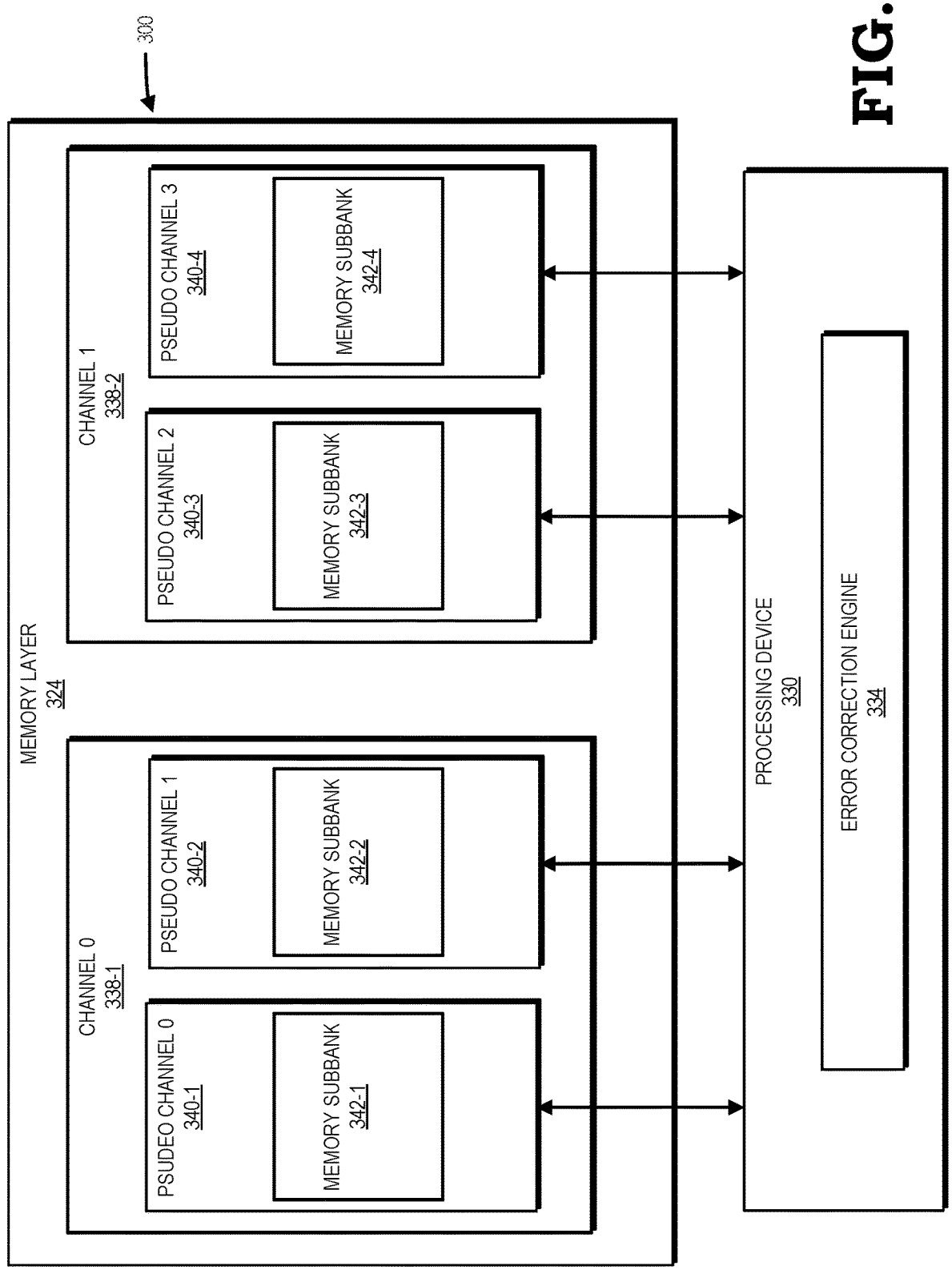
FIG. 3 is a block diagram of a processing system for host-level error correction and detection over one or more memory pseudo channels, in accordance with some embodiments.

Referring now to FIG. 3, a block diagram of a processing system 300 for host-level error correction and detection over one or more memory pseudo channels is presented. The processing system 300 includes a processing device, similar to or the same as CPU 102, GPU 114, or processing device 230, communicatively coupled to a memory layer 324, similar to or the same as memory layers 224, of a memory, similar to or the same as memory 106, 206. In embodiments, memory layer 324 is one of a plurality of layers in a 3D-stacked SDRAM and includes one or more memory banks, memory subbanks, or both each configured to store data. According to embodiments, memory layer 324 includes one or more channels 338 each configured to allow access to the data in one or more memory banks, memory subbanks, or both of memory layer 324. In some embodiments, each channel 338 is configured to allow access to the data in one or more distinct memory banks of memory layer 324. For example, in the example embodiment illustrated in FIG. 3, memory layer 324 includes channel 0 338-1 configured to allow access to a first memory bank (not illustrated for clarity) and channel 1 338-2 configured to allow access to a second memory bank (not illustrated for clarity). Each channel 338 has a width representing the maximum amount of data allowed to be concurrently read from or written to the memory banks associated with the channel 338. For example, each channel 338 has a width of 64 bits.

In embodiments, memory layer 324 is configured to operate in a pseudo channel mode. While in the pseudo channel mode, each channel 338 of memory layer 324 operates as two or more distinct pseudo channels 340. For example, in the example embodiment illustrated in FIG. 3, while in a pseudo channel mode, channel 0 338-1 operates as pseudo channel 0 340-1 and pseudo channel 1 340-2 and channel 1 338-2 operates as pseudo channel 2 340-3 and pseudo channel 3 340-4. Each pseudo channel 340 is configured to allow access to the data in at least a portion of the memory banks, memory subbanks, or both associated with its respective channel 338. For example, in the example embodiment illustrated in FIG. 3, pseudo channel 0 340-1 is configured to allow access to a first memory subbank 342-1 which is a memory subbank of the memory bank associated with channel 0 338-1 and pseudo channel 1 340-2 is configured to allow access to a second memory subbank 342-2 which a second, different memory subbank of the memory bank associated with channel 0 338-1. Each pseudo channel 340 has a width representing the maximum amount of data allowed to be concurrently read from or written to the memory banks, memory subbanks, or both associated with the pseudo channel 340. According to embodiments, each pseudo channel has a width equal to half the width of its associated channel. For example, in the example embodiment illustrated in FIG. 3, channel 0 338-1 has a width of 64 bits making the widths of pseudo channel 0 340-1 and pseudo channel 1 340-2 32 bits.

In embodiments, processing device 330 is communicatively coupled to memory layer 324 by channels 338. For example, processing device 330 is coupled to memory layer 324 by channels 338 by way of a logic layer, similar to or the same as logic layer 226 including one or more memory controllers configured to control the access, modification, and deletion of data stored in memory layer 324. Processing device 330 is configured to generate one or more fetch requests (e.g., cache line fetches) each identifying data to be read out from memory layer 324 and transmit the fetch requests to memory layer 324 via one or more channels 338 associated with memory layer 324. According to embodiments, processing device 330 is configured to divide a fetch request into one or more fetch portions based on the width of channels 338. For example, based on a 64-bit channel width, processing device 330 is configured to divide a 128-bit fetch request into two 64-bit fetch portions. In embodiments, while memory layer 324 is operating in a pseudo channel mode, processing device 330 is configured to divide a fetch request into a set of one or more fetch portions based on the width of pseudo channels 340. For example, based on each pseudo channel 340 having a width of 32 bits, processing device 330 is configured to divide a 128-bit fetch request (i.e., a fetch request requesting 128 bits of data) into a set of four 32-bit fetch portions. After dividing a fetch request into two or more fetch portions, processing device 330 is configured to provide the fetch portions to the logic layer controlling access to memory layer 324 via one or more channels 338, pseudo channels 340, or both. That is to say, processing device 330 provides the fetch portions to the logic layer using one or more channels 338, pseudo channels 340, or both. For example, in the example embodiment illustrated in FIG. 3, processing device 330 is configured to divide a 128-bit fetch request (i.e., a fetch request requesting 128 bits of data) into a set of four 32-bit fetch portions and transmit two fetch portions to a logic layer using pseudo channel 0 340-1 and another two fetch portions to the logic layer using pseudo channel 1 340-2.

In response to receiving one or more fetch portions over one or more channels 338, pseudo channels 340, or both, memory layer 324 is configured to read the data identified in the fetch portions out of one or more memory banks, memory subbanks, or both associated with the channels 338, pseudo channels 340, or both. For example, in the example embodiment illustrated in FIG. 3, in response to receiving a fetch portion over pseudo channel 2 340-3, memory layer 324 (e.g., via a logic layer) is configured to read data identified in the fetch portion out of memory subbank 342-3. According to embodiments, memory layer 324 is configured to check the data identified in one or more received fetch portions and read out of one or more memory banks, memory subbanks, or both, for faults. That is to say, memory layer 324 is configured to check the read-out data for one or more faults (e.g., uncorrected errors). For example, memory layer 324 (e.g., by using a logic layer) is configured to check the read-out data based on one or more ECCs implemented by the memory layer 324. In embodiments, memory layer 324 is configured to check the read-out data by comparing (e.g., using a logic layer) check bits associated with the read-out data to one or more values (e.g., thresholds, values, strings), performing one or more operations on the read-out data, or both. According to embodiments, the check bits associated with the read-out data are stored in the memory band or memory subbank storing the data. In response to determining that one or more faults are present in the read-out data, memory layer 324 (e.g., using a logic layer) is configured to correct the data to be read out using, for example, other data stored in one or more memory banks, data stored in one or more memory subbanks, one or more parity bits, or both. In embodiments, memory layer 324 is configured to transmit the read-out data as one or more fetch returns to processing device 330 using one or more channels 338 pseudo channels 340, or both. According to embodiments, memory layer 324 is configured to transmit a fetch return on the same channels and pseudo channels that received the fetch portions identifying the data included in the fetch return. For example, in the example embodiment illustrated in FIG. 3, in response to receiving a fetch portion identifying data to be read out on pseudo channel 1 340-2, memory layer 324 is configured to read out and transmit the data identified in the fetch portion as a fetch return on pseudo channel 1 340-2. In embodiments, memory layer 324 is configured to send one or more unused check bits (e.g., check bits not used to detect or correct faults in the read-out data) with the fetch returns to processing device 330 using one or more channels 338 pseudo channels 340, or both.

According to embodiments, processing device 330 is configured to generate one or more parity requests each associated with one or more fetch requests, fetch portions, or both. For example, processing device 330 is configured to generate a parity request associated with one or more fetch portions divided from the same fetch request. Each parity request identifies, for example, one or more fetch portions and one or more operations to be performed on the data identified in the fetch portions. In embodiments, processing device 330 is configured to send the parity request to memory layer 324 (e.g., by way of a logic layer) using one or more channels 338, pseudo channels 340, or both. For example, processing device 330 is configured to send a parity request using the same pseudo channels 340 over which the fetch portions associated with the parity request were sent to memory layer 324. In response to receiving the parity request, memory layer 324 is configured to generate and return a parity fetch. To generate the parity fetch, memory layer 324 is configured (e.g., using a logic layer) to perform one or more operations identified on the read-out data identified in the parity request. For example, memory layer 324 is configured to perform a XOR operation on the read-out data identified in four fetch portions identified by the parity request. In some embodiments, memory layer 324 is configured to perform the operations identified in a parity request on the data identified in the parity request after the data has been checked for and corrected of faults using one or more ECCs. In this way, memory layer 324 (e.g., using a logic layer) is configured to generate a parity fetch such that the parity fetch includes the data resulting from performing one or more operations on the data identified in the parity request. For example, based on a parity request, memory layer 324 is configured to generate a parity fetch including data resulting from performing a XOR operation on the data identified in four fetch portions associated with the parity fetch. In response to generating a parity fetch, memory layer 324 (e.g., using a logic layer), is configured to send the parity fetch to processing device 330 by one or more channels 338, pseudo channels 340, or both. For example, memory layer 324 is configured to send a parity fetch to processing device 330 using the pseudo channel 340 that was used to send an associated parity request (e.g., the parity request used to generate the parity fetch) from processing device 330 to memory layer 324.

In response to receiving one or more fetch returns on one or more channels or pseudo channels, processing device 330 is configured to check the received fetch returns for one or more faults (e.g., uncorrected errors). To check the fetch returns for faults, processing device 330 includes error correction engine 334, similar to or the same as error correction engine 234, including hardware and software configured to check a fetch return for one or more faults based on one or more ECCs (e.g., CRC codes (e.g., CRC-9, CRC-12, CRC-16), symbol-based codes, LRC codes, check sum codes, parity check codes, Hamming Codes, binary convolution codes). According to embodiments, error correction engine 334 is configured to check for faults of one or more fetch returns using the unused check bits returned with one or more fetch returns. For example, in response to processing device 330 receiving a fetch return and one or more check bits, error correction engine 334 is configured to check the data of the fetch return for one or more faults based on a CRC code and the unused check bits. In embodiments, error correction engine 334 is configured to check for one or more faults of a fetch return by comparing one or more unused check bits to one or more values (e.g., thresholds, values, strings), performing one or more operations, or both. For example, error correction engine 334 is configured to check for one or more faults of a fetch return by performing one or more operations on the unused check bits according to an implemented ECC.

In response to determining one or more faults in a fetch return, error correction engine 334 is configured to erase and reconstruct the fetch return. In embodiments, error correction engine 334 is configured to reconstruct a fetch return using the data in one or more other fetch returns, one or more parity fetches, or both. For example, error correction engine 334 is configured to reconstruct a fetch return using one or more associated fetch returns (e.g., fetch returns based on the same fetch request, associated fetch portions, or both) and a parity fetch associated with the fetch return (e.g., a parity fetch based on the same fetch request, associated fetch portions, or both). After reconstructing the fetch return, the reconstructed fetch return and any associated fetch returns (e.g., fetch returns based on the same fetch request, associated fetch portions, or both) are sent to a cache, similar to or the same as cache 236, included in or otherwise communicatively coupled to processing device 330. In embodiments, the reconstructed fetch return and any associated fetch returns are sent to a data fabric communicatively coupled to processing device 330 and the cache.

According to embodiments, processing device 330 is configured to generate one or more write requests identifying data in one or more caches communicatively coupled to processing device 330 to be stored in memory layer 324. In embodiments, processing device 330 is configured to divide a write request into one or more write portions based on the width of channels 338. For example, based on a 64-bit channel width, processing device 330 is configured to divide a 128-bit write request into two 64-bit write portions. While memory layer 324 is operating in a pseudo channel mode, processing device 330 is configured to divide a write request into one or more write portions based on the width of pseudo channels 340. For example, based on each pseudo channel 340 having a width of 32 bits, processing device 330 is configured to divide a 128-bit write request into four 32-bit write portions. In embodiments, error correction engine 334 is configured to generate a check value for each write request according to one or more implemented ECCs. That is to say, error correction engine 334 generates a check value for the data identified in a write portion according to one or more ECCs. For example, error correction engine 334 is configured to generate a check value using a CRC-9 code. In response to generating a check value for a write portion, the check value is added to the write portion such that the write portion includes data identifying data to be written to memory layer 324 (e.g., data stored in one or more caches communicatively coupled to processing device 330) and the check value generated for the write portion. After generating the write portion for each write portion of a write request (e.g., all the write portion divided from the write request), processing device is configured to send the write requests to the logic layer communicatively coupled to memory layer 324 using one or more channels 338, pseudo channels 340, or both. The logic layer is configured to store the data identified in write requests and the check values of the write requests to one or more memory banks associated with the channel 338 or pseudo channel 340 on which the write request was received. For example, in response to receiving a write portion on pseudo channel 3 340-4, the logic layer is configured to store the data identified in the write portion and the check value of the write portion to memory subbank 342-4.

Figure 4:
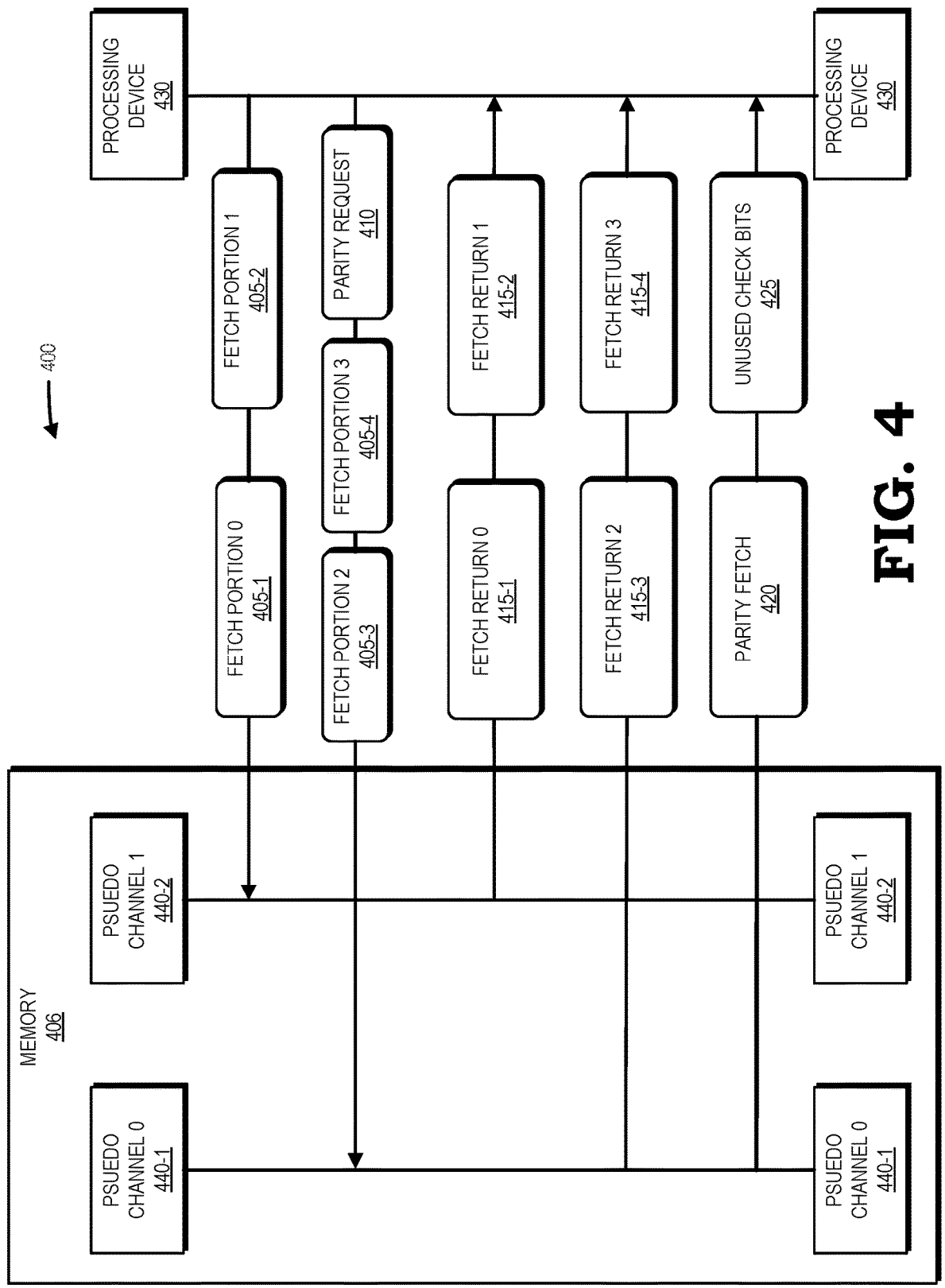
FIG. 4 is a flow diagram of an example process for host-level error correction during a read operation, in accordance with some embodiments.

Referring now to FIG. 4, a flow diagram of an example process 400 for host-level error correction during a read operation is present. The process 400 includes a processing device 430, similar to or the same as CPU 102, GPU 114, processing device 230, 330, or any combination thereof, configured to generate a fetch request identifying requested data. That is to say, processing device 430 generate a fetch request that identifies data to be read out of a memory 406, similar to or the same as memory 106, 206. Processing device 430 is further configured to divide the fetch request into one or more fetch portions (e.g., 405-1, 405-2, 405-3, 405-4) each identifying a distinct portion of the data identified in the fetch request. For example, processing device 430 is configured to divide a 128-bit fetch request (i.e., a fetch request requesting 128 bits of data) into a set of four 32-bit fetch portions 405. Though in the example embodiment illustrated in FIG. 4, processing device 430 divides a fetch request into a set of four fetch portions (405-1, 405-2, 405-3, 405-4), in other embodiments, processing device 430 may be configured to divide a fetch request into any number of fetch portions. In response to generating one or more fetch portions 405, processing device 430 is configured to send a first number of the fetch portions 405 to memory 406 using a first pseudo channel 440-1 and a second number of the fetch portions to memory 406 using a second pseudo channel 440-2. Though the example embodiment illustrated in FIG. 4 presents two fetch portions (fetch portion 0 405-1 and fetch portion 1 405-2) being sent on pseudo channel 0 440-1 and two fetch portions (fetch portion 2 402-3 and fetch portion 3 402-4) being sent on pseudo channel 1 440-2, in other embodiments, processing device 430 can send any number of fetch portions 405 on pseudo channel 0 440-1 and any number of fetch portions 405 on pseudo channel 1 440-2.

According to embodiments, in response to dividing a fetch request into two or more fetch portions, processing device 430 is configured to generate a parity request 410 that identifies each fetch portion 405 associated with the fetch request and one or more operations to perform on the data identified in the fetch portions. For example, parity request 410 identifies fetch portion 0 405-1, fetch portion 1 405-2, fetch portion 2 405-3, and fetch portion 3 405-4 and a XOR operation to perform on the data identified in fetch portion 0 405-1, fetch portion 1 405-2, fetch portion 2 405-3, and fetch portion 3 405-4 (e.g., data of fetch portion 1⊕data of fetch portion 2⊕data of fetch portion 3⊕data of fetch portion 4). In response to generating the parity request 410, processing device 430 is configured to send the parity request 410 to memory 406 using one or more pseudo channels used to send one or more of the fetch portions 405. For example, in the example embodiment illustrated in FIG. 4, processing device 430 is configured to send the parity request 410 to memory 406 using pseudo channel 1 440-2.

In response to receiving one or more fetch portions 405, memory 406 is configured to read out the data identified in the fetch portions 405 from one or more memory banks, memory subbanks, or both associated with the pseudo channel 440 that received the fetch portions. For example, in response to receiving fetch portion 0 405-1 on pseudo channel 1 440-2, memory 406 is configured to read out the data identified in fetch portion 405-1 from one or more memory banks, memory subbanks, or both associated with pseudo channel 1 440-2. According to embodiments, in response to reading out the data identified in the fetch portions 405, memory 406 is configured to check the read-out data for one or more faults (e.g., uncorrected errors). To check the read-out data for one or more faults, memory 406 is configured to compare one or more check bits associated with the read-out data to one or more values (e.g., thresholds, values, strings), perform one or more operations on the check bits, or both based on one or more ECCs implemented by memory 406 (e.g., a CRC code). In embodiments, the check bits associated with the read-out data are stored in the same memory bank, memory subbank, or both as the read-out data. In response to memory 406 detecting a fault in the read-out data, memory 406 is configured to correct the fault using other data stored in one or more memory banks, memory subbanks, or both of memory 406, using one or more parity bits, or both. According to embodiments, memory 406 is configured to check the read-out data for one or more faults bound to a predetermined number of bits. That is to say, faults limited to respective portions of the read-out data each including the predetermined number of bits. To check the read-out data for one or more faults bound to a predetermined number of bits, memory 406 is configured to use a number of check bits based on the predetermined number of bits. For example, to check the read-out data for faults bound to 16 bits, memory 406 is configured, for example, to use 16 check bits. As such, in response to checking the read-out data for one or more faults bound to a predetermined number of bits, one or more of the check bits related to the read-out data are left unused (e.g., they are not used to check the read-out data for faults). That is to say, in response to checking the read-out data for one or more faults bound to a predetermined number of bits, memory 406 is configured to use a number of check bits to check for one or more faults such that one or more unused check bits remain.

According to embodiments, memory 406 is configured to generate one or more fetch returns 415 for each received fetch portion 405. Each fetch return 415 includes read-out data identified (i.e., requested) in a respective fetch portion 405. In embodiments, memory 406 is configured to send a number of fetch returns 415 on a first pseudo channel 440-1 and a second number of fetch returns 415 on a second pseudo channel 440-2. For example, memory 406 is configured to send each fetch return 415 on the same pseudo channel 440 that an associated fetch portion 405 (e.g., the fetch portion identifying the data contained in the fetch return) was received. As an example, the example embodiment illustrated in FIG. 4 presents fetch return 0 415-1 and fetch return 1 415-2 sent on pseudo channel 1 440-2 on which fetch portion 0 405-1 and fetch portion 405-2 were received and fetch return 2 415-3 and fetch return 3 415-4 sent on pseudo channel 0 440-1 on which fetch portion 2 405-3 and fetch portion 3 405-4 were received.

In response to generating one or more fetch returns 415, memory 406 is configured to generate a parity fetch 420. Parity fetch 420 includes data resulting from performing one or more operations identified in parity request 410 on the read-out data included in the fetch returns 415. For example, in the example embodiment illustrated in FIG. 4, fetch return 0 415-1 includes a first set of read-out data (D0), fetch return 1 415-2 includes a second set of read-out data (D1), fetch return 2 415-3 includes a third set of read-out data (D2), and fetch return 3 415-4 includes a fourth set of read-out data (D3). In the example embodiment, memory 406 is configured to generate parity fetch 420 by performing one or more operations identified in parity request 410, for example, a XOR operation, on D0, D1, D2, and D3. That is to say, parity fetch 420 includes data resulting from a XOR operation performed on the read-out data of the fetch returns 415 (e.g., $D0 \oplus D1 \oplus D2 \oplus D3$). In response to generating the parity fetch 420, memory 406 is configured to send the parity fetch 420 to processing device 430 using one or more pseudo channels 440. Additionally, in response to generating one or more fetch returns 415, memory 406 is configured to send one or more unused check bits 425 to processing device 430 using one or more pseudo channels 440. That is to say, memory 406 is configured to send one or more check bits not used to check the read-out data in the fetch returns for one or more faults bounded to a predetermined number of bits. According to embodiments, the number of unused check bits 425 sent to processing device 430 is based on the predetermined number of bits of the bounded faults checked for in the read-out data. For example, in response to memory 406 checking the read-out data for faults bound to 16 bits, 16 unused check bits are sent to processing device 430. In some embodiments, one or more unused check bits 425 are returned as part of one or more fetch returns 415, while in other embodiments the unused check bits 425 are returned separately from the fetch returns 415.

In response to receiving the fetch returns 415, parity fetch 420, and check bits 425, processing device 430 is configured to check each fetch return 415 for faults (e.g., uncorrected errors) according to one or more implemented ECCs. For example, processing device 430 includes an error correction engine, similar to or the same as error correction engine 234, 334 configured to check each fetch return 415 for faults by using one or more unused check bits 425 associated with the fetch return 415 (e.g., unused check bits 425 returned with the fetch return 415, included in the fetch return 415, or both). In embodiments, processing device 430 is configured to determine the presence of one or more errors in a fetch return 415 by comparing one or more of the unused check bits 425 to one or more values (e.g., thresholds, values, strings), performing one or more operations on one or more check bits 425, or both. For example, the processing device checks for one or more faults of a fetch return 415 by performing one or more operations on one or more check bits 425 according to an implemented ECC (e.g., CRC-12). In response to detecting one or more faults in a fetch return 415, processing device 430 is configured to erase and reconstruct the fetch return 415. According to embodiments, processing device 430 is configured to reconstruct the fetch return 415 using data from one or more other fetch returns, parity fetch 420, or both. For example, in the example embodiment illustrated in FIG. 4, processing device 430 is configured to reconstruct fetch return 2 415-3 using data from fetch return 0 415-1, fetch return 1 415-2, fetch return 3 415-4, and parity fetch 420. In this way, any fault isolated to a single fetch return is corrected. Correcting faults in this way helps improve the reliability of the system, reducing the chance for a field replacement unit event, the termination of applications using the memory, system reboot, or any combination thereof to occur.

Figure 5:
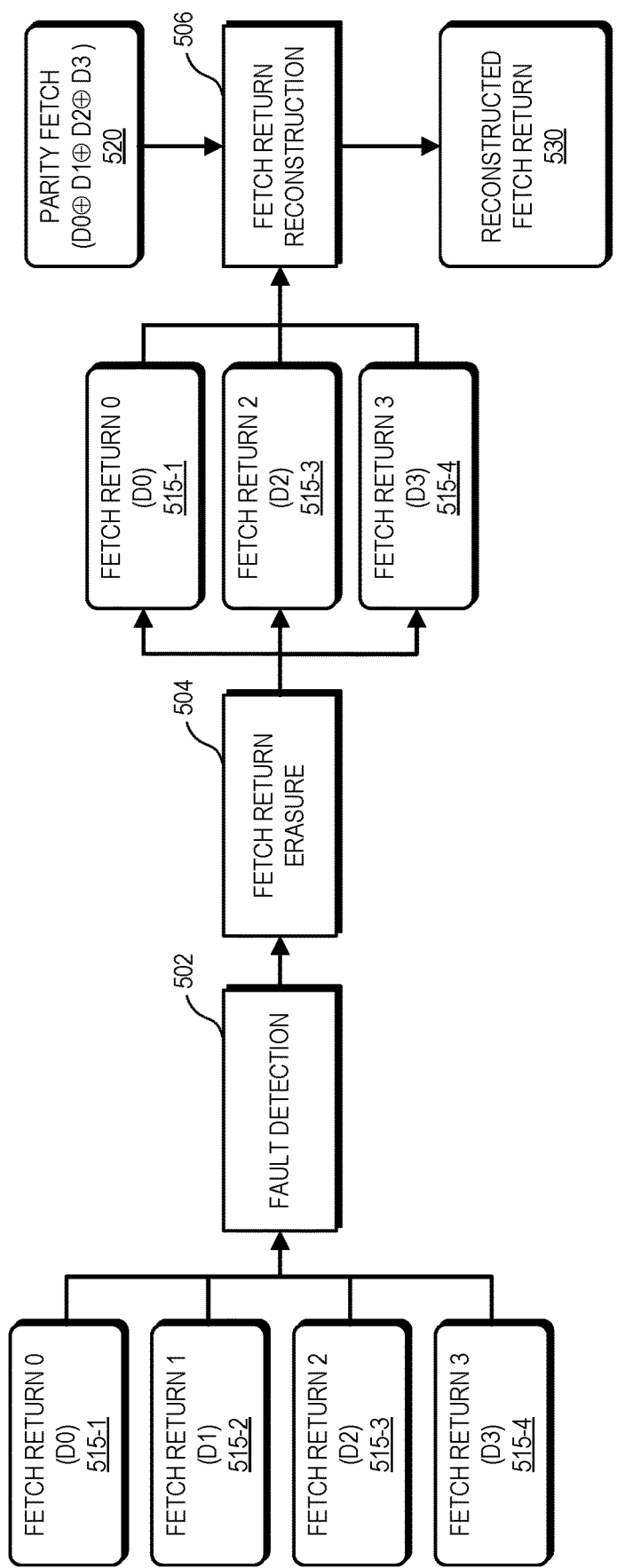
FIG. 5 is a flow diagram of an example process for correcting one or more faults in a fetch return, in accordance with some embodiments.

Referring now to FIG. 5, a flow diagram of an example process 500 for correcting one or more faults in a fetch return is presented. In embodiments, the process 500 includes a processing device, similar to or the same as CPU 102, GPU 114, processing device 230, 330, 430, or any combination thereof, configured to perform a fault detection operation 502 for one or more received fetch returns 515, similar to or the same as fetch returns 415. Though the example embodiment illustrated in FIG. 5 presents four fetch returns (fetch return 0 515-1, fetch return 1 515-2, fetch return 2 515-3, fetch return 3 515-4) received by the processing device, in other embodiments any number of fetch returns 515 may be received. According to embodiments, each fetch return 515 includes at least a portion of data read-out of a memory similar to or the same as memory 106, 206, 306, 406. For example, in the example embodiment of FIG. 5, fetch return 0 515-1 includes a first portion of read-out data (D0), fetch return 1 515-2 includes a second portion of read-out data (D1), fetch return 2 515-3 includes a third portion of read-out data (D2), and fetch return 3 515-4 includes a fourth portion of read-out data (D3). The fault detection operation 502 includes the processing device checking the data of each fetch return 515 (e.g., D0, D1, D2, D3) for one or more faults based on an ECC implemented by the processing device and one or more unused check bits received from the memory (e.g., check bits not used by the memory to check D0, D1, D2, or D3 for one or more faults). For example, the processing device checks D0, D1, D2, and D3 for one or more faults based on a CRC-12 code and one or more unused check bits.

In response to the processing device detecting a fault in one or more fetch returns 515 (e.g., a fault in the data of one or more fetch returns), the processing device performs a fetch return erasure operation 504 on the fetch returns including a fault (e.g., faulty fetch). For example, in the example embodiment of FIG. 5, in response to the processing device detecting a fault in D1, the processing device performs a fetch return erasure operation 504 on fetch return 1 515-2. The fetch return erasure operation 504 includes erasing the fetch return including one or more faults (e.g., faulty fetch). In response to erasing one or more fetch returns (e.g., faulty fetches), the processing device performs a fetch return reconstruction operation 506 that includes reconstructing one or more erased fetch returns 515 based on one or more other fetch returns 515 associated with the erased fetch return (e.g., fetch returns 515 returned with the erased fetch return, fetch returns 515 of the same set as the erased fetch, fetch returns 515 corresponding to the same fetch request), a parity fetch 520, similar to or the same as parity fetch 420, associated with the erased fetch return (e.g., returned with the erased fetch return, corresponding to the same fetch request), or both such that a reconstructed fetch return 530 is generated. For example, in the example embodiment of FIG. 5, fetch reconstruction operation 506 includes reconstructing fetch return 1 515-1 based on fetch return 0 515-1, fetch return 2 515-3, fetch return 3 515-4, and parity fetch 520. According to embodiments, parity fetch 520 includes data resulting from the memory performing one or more operations on the data of the fetch returns 515 before they are received by the processing device. For example, in the example embodiment of FIG. 5, parity fetch 520 includes data resulting from the memory performing a XOR operation on D0, D1, D2, and D3 (e.g., D0⊕D1⊕D2⊕D3). In embodiments, fetch return reconstruction operation 506 includes the processing device performing one or more operations on the data included in one or more other fetch returns 515 associated with the erased fetch return, data included in the parity fetch 520, or both. For example, in the example embodiment of FIG. 5, the fetch return reconstruction operation 506 includes performing a XOR operation on the data included in fetch return 0 515-1 (D0), fetch return 2 515-3 (D2), fetch return 3 515-4 (D3), and parity fetch 520 (D0⊕D1⊕D2⊕D3). According to embodiments, the reconstructed fetch return 530 includes data resulting from performing one or more operations on the data included in one or more other fetch returns 515 associated with the erased fetch return 515, data included in the parity fetch 520, or both. For example, reconstructed fetch return 530 includes data resulting from performing a XOR operation on the data included in fetch return 0 515-1 (D0), fetch return 2 515-3 (D2), fetch return 3 515-4 (D3), and parity fetch 520 (D0⊕D1⊕D2⊕D3), to generate for example, D1.

Figure 6:
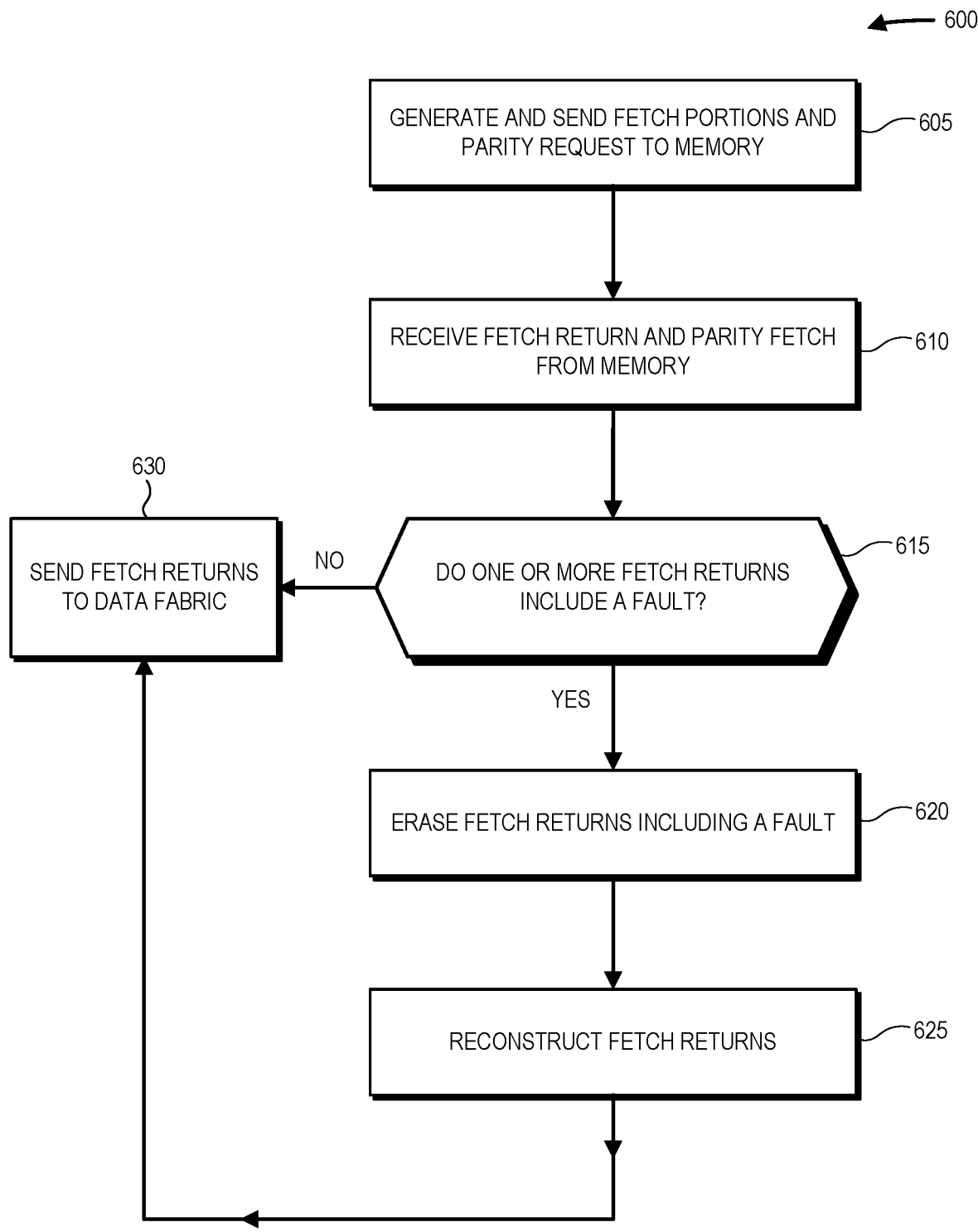
FIG. 6 is a flow diagram of an example method for host-level error detection during a read operation, in accordance with some embodiments.

Referring now to FIG. 6, a flow diagram of an example method 600 for host-level error detection during a read operation is presented. At step 605 of method 600, a processing device, similar to or the same as CPU 102, GPU 114, processing device 230, 330, 430, or any combination thereof, is configured to generate a fetch request requesting data to be read out of one a memory similar to or the same as memory 106, 206, 406. According to embodiments, the memory includes a 3D-stacked SDRAM having two or more stacked memory layers each having two or more channels. In embodiments, the processing device divides the fetch request into one or more fetch portions each identifying a distinct portion of the data requested in the fetch request. For example, the processing device divides a 128-bit fetch request (i.e., a fetch request identifying 128 bits of request data) into four 32-bit fetch portions each identifying a 32-bit portion of the data requested in the 128-bit fetch request. Further, at step 605, the processing device generates a parity request based on the fetch portions divided from the fetch request. The parity request indicates the data identified in each fetch portion and one or operations to perform on the identified data. For example, the parity request indicates the data identified in each fetch portion and a XOR operation. In response to generating the fetch portions and the parity request, the processing device sends the fetch portions and the parity request to the memory using one or more channels, pseudo channels, or both associated with the memory.

At step 610, in response to receiving one or more fetch portions, the memory reads out the data identified in the fetch portions from one or more memory banks, memory subbanks, or both of the memory. For example, the memory reads out the data identified in the fetch portions from a memory subbank associated with a pseudo channel that received the fetch portions. In response to reading out the data identified in the fetch portions, the memory checks the read-out data for one or more faults (e.g., uncorrected errors) based on one or more implemented ECCs. For example, the memory detects one or more faults in the read-out data based on an on-die ECC implemented by the memory. According to embodiments, the memory detects one or more faults in the read-out data by, for example, comparing one or more check bits associated with the read-out data to one or more values (e.g., thresholds, values, strings), performing one or more operations on one or more check bits according to one or more implemented ECCs, or both. In response to detecting one or more faults in the read-out data, the memory corrects the fault using data stored in one or more memory banks, subbanks, or both of the memory, using one or more parity bits stored in the memory, or both. In embodiments, the memory is configured to detect one or more faults bound to a predetermined number of bits in the read-out data. For example, the memory is configured to detect faults bounded to 16 bits in the read-out data. According to embodiments, to detect one or more faults bound to a predetermined number of bits in the read-out data, the memory is configured to use a number of check bits based on the predetermined number of bits such that one or more unused check bits remain. For example, to determine one or more faults bound to 16 bits in the read-out data, the memory is configured to use 16 check bits such that 16 unused check bits remain.

After detecting and correcting any faults, the memory generates one or more fetch returns. Each fetch return includes read-out data identified in a respective received fetch portion. That is to say, the memory generates a respective fetch return for each received fetch portion. Further at step 610, the memory generates a parity fetch based on the received parity request and the fetch returns. The parity fetch includes data resulting from performing the operations identified in the parity request on the read-out data of the generated fetch returns. For example, the parity fetch includes data resulting from performing a XOR operation on the read-out data of each of the fetch returns. After generating the fetch returns and the parity fetch, the memory sends the fetch returns, one or more unused check bits (e.g., check bits not used to detect or correct faults in the read-out data), and the parity fetch over one or channels, pseudo channels, or both of the memory and they are received at the processing device.

At step 615, the processing device determines if one or more of the fetch returns include a fault (e.g., uncorrected error). In embodiments, the processing device determines if one or more of the fetch returns include a fault by comparing one or more received unused check bits to one or more values (e.g., thresholds, values, strings), performing one or more operations one or more unused check bits based on an ECC implemented by the processing device, or both. As an example, the processing device determines if a fault is present in a fetch return by performing one or more operations on one or more unused check bits according to a CRC-9 code. In response to no fetch returns including a fault, the system moves to step 630 and the processing device sends the fetch returns to a data fabric coupled to the processing device and one or more caches, similar to or the same as cache 236. In response to one or more fetch returns including a fault, the system moves on to step 620. At step 620, the processing device erases the fetch returns that include a fault. At step 625, the processing device reconstructs the erased fetch returns. In embodiments, the processing device reconstructs the erased fetch returns using data in one or more other fetch returns and the parity fetch. That is to say, the processing device reconstructs the erased fetch returns based on the read-out data included in the other fetch returns and the data in the parity fetch. In this way, any fault isolated to a single fetch return (e.g., driver faults, bank faults) is corrected improving the reliability of the system. After reconstructing the fetch returns including faults, the system moves to step 630 and the fetch returns (e.g., including the reconstructed fetch returns) are sent to the data fabric communicatively coupled to the processing device and one or more caches.

Figure 7:
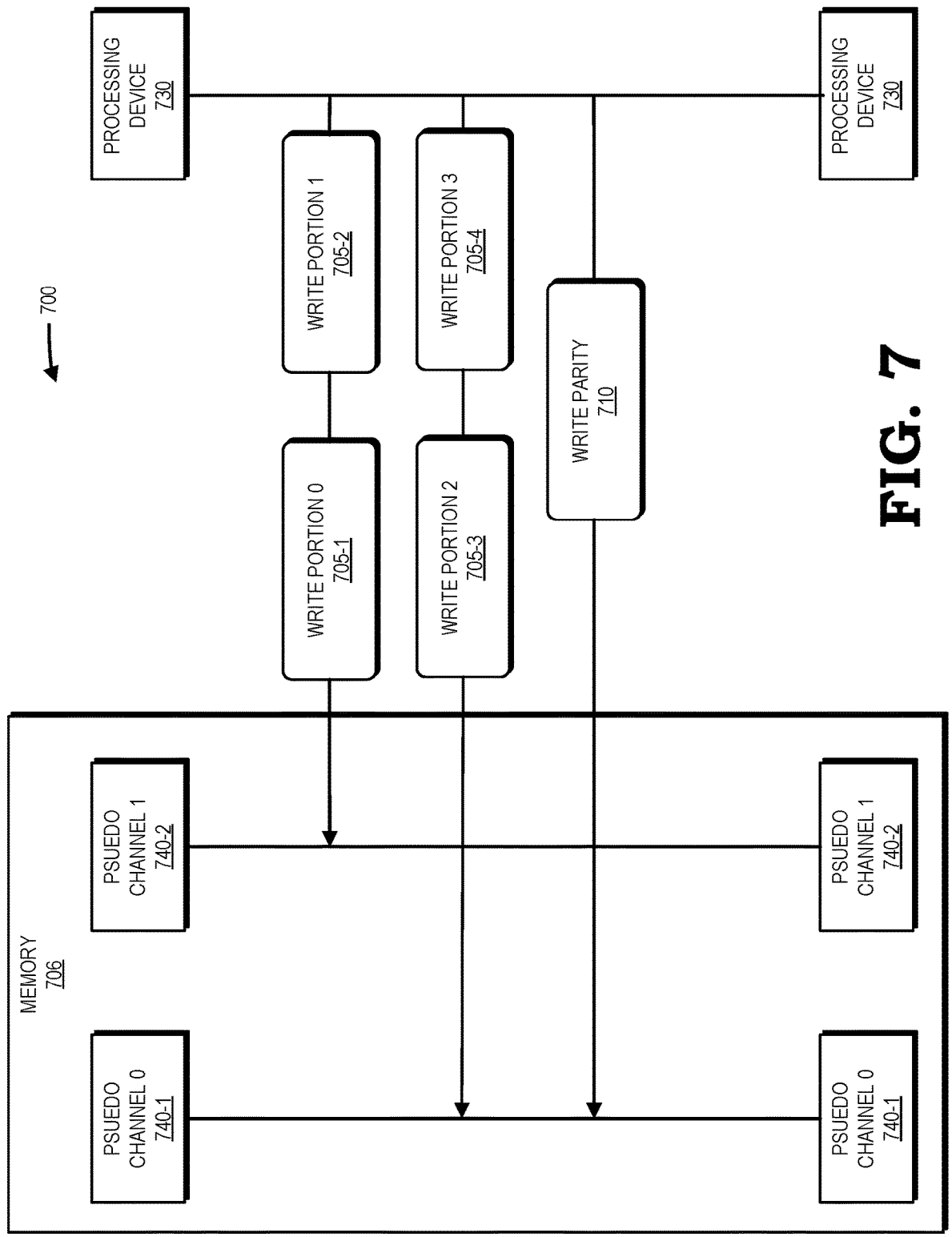
FIG. 7 is a flow diagram of an example process for host-level error correction during a write operation, in accordance with some embodiments.

Referring now to FIG. 7, a flow diagram of an example process 700 for host-level error correction for a write operation is presented. The process 700 includes a processing device 730, similar to or the same as CPU 102, GPU 114, processing device 230, 330, 430, or any combination thereof, configured to generate a write request identifying data to be written to one or more portions of a memory 706, similar to or the same as memory 106, 206, 406. Processing device 730 is further configured to divide the write request into one or more write portions (e.g., 705-1, 705-2, 705-3, 705-4) each identifying a distinct portion of the data to be written identified in the write request. For example, processing device 730 is configured to divide a 128-bit write request into four 32-bit write portions 705. Though in the example embodiment illustrated in FIG. 6, processing device 730 divides a write request into four write portions (705-1, 705-2, 705-3, 705-4), in other embodiments, processing device 730 may be configured to divide a write request into any number of write portions. In response to generating one or more write portions 705, processing device 730 is configured to generate a check value for each write portion 705 and add the generated check value to the write portion 705 such that the write portion 705 includes data identifying data to be written and a check value associated with the data to be written. In embodiments, processing device 730 is configured to generate a check value for a write portion 705 based on one or more ECCs implemented by processing device 730, for example, a CRC-12 code. After adding the respective check values to each write portion 705, processing device 730 is configured to send a first number of the write portions 705 to memory 706 using a first pseudo channel 740-1 and a second number of the write portions to memory 706 using a second pseudo channel 740-2. Though the example embodiment illustrated in FIG. 7 presents two write portions (write portion 0 705-1 and write portion 1 705-2) being sent on pseudo channel 0 740-1 and two write portions (write portion 2 602-3 and write portion 3 602-4) being sent on pseudo channel 1 740-2, in other embodiments, processing device 730 can send any number of write portions 705 on pseudo channel 0 740-1 and any number of write portions 705 on pseudo channel 1 740-2.

According to embodiments, processing device 730 is further configured to generate write parity 710 based on the data to be written identified in each write portion 705. Write parity 710 includes, for example, data resulting from performing one or more operations on the data to be written identified in each write portion 705. For example, based on the data to be written identified in write portion 0 705-1 (W0), write portion 1 705-2 (W1), write portion 2 705-3 (W2), and write portion 3 705-3 (W3), processing device 730 is configured to generate write parity 710 by performing a XOR operation on W0, W1, W2, and W3 (e.g., W0⊕W1⊕W2⊕W3). In response to generating the write parity 710, processing device 730 is configured to send the write parity 710 to memory 706 using one or more pseudo channels 740 of memory 706. In response to receiving the write portions 705 and the write parity 710, memory 706 is configured to store the data identified in the write portions 705, the check values of the write portions, and the data of write parity 710 in one or more portions of memory 706. In embodiments, memory 706 is configured to store the data of write portions 705, write parity 710, or both, based on the pseudo channel 740 on which the write portions 705 or write parity 710 was received. For example, in response to receiving write portion 0 705-1 and write portion 1 705-2 on pseudo channel 1 740-2, the memory is configured to store the data identified in write portion 0 705-1 and write portion 1 705-2 and the check values of write portion 0 705-1 and write portion 1 705-2 in one or more memory banks, memory subbanks, or both associated with pseudo channel 1 740-2.

In some embodiments, the apparatus and techniques described above are implemented in a system including one or more integrated circuit (IC) devices (also referred to as integrated circuit packages or microchips), such as the processing system for host error correction for read and write operations described above with reference to FIGS. 1-6. Electronic design automation (EDA) and computeraided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction formats that are interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   based on a check bit indicating a fetch return of a plurality of fetch returns includes a fault, reconstructing, at a processing device, the fetch return based on a parity fetch associated with the plurality of fetch returns and based on one or more other fetch returns of the plurality of fetch returns; and
   sending the reconstructed fetch return to one or more caches communicatively coupled to the processing device.

2. The method of claim 1, further comprising:
   sending, to a memory, a plurality of fetch portions each identifying requested data; and
   sending, to the memory, a parity request identifying the plurality of fetch portions and one or more operations.

3. The method of claim 1, wherein determining the fetch return of the plurality of fetch returns includes a fault comprises:
   performing an operation on the check bit according to an error correction code implemented by the processing device.

4. The method of claim 3, wherein the error correction code comprises a cyclic redundancy check code.

5. The method of claim 1, further comprising:
   checking, at a memory communicatively coupled to the processing device, requested data identified in the plurality of fetch returns for one or more faults based on an error correction code implemented by the memory.

6. The method of claim 5, wherein the check bit comprises a check bit unused to check, at the memory, the requested data identified in the plurality of fetch returns for one or more faults.

7. The method of claim 5, wherein the error correction code implemented by the memory comprises an on-die error correction code.

8. The method of claim 1, wherein a first number of the fetch returns are received at the processing device on a first pseudo channel of a memory and a second number of the fetch returns are received at the processing device on a second pseudo channel of the memory.

9. The method of claim 8, wherein the memory comprises a three-dimensional stacked synchronous dynamic random-access memory.

10. A system, comprising:
a memory; and
a processing device coupled to the memory, the processing device configured to:
based on a check bit indicating a fetch return of a plurality of fetch returns includes a fault, reconstruct the fetch return based on a parity fetch associated with the plurality of fetch returns and based on one or more other fetch returns of the plurality of fetch returns; and
send the reconstructed fetch return to a data fabric communicatively coupled to the processing device.

11. The system of claim 10, the processing device further configured to:
send, to the memory, a plurality of fetch portions each identifying requested data; and
send, to the memory, a parity request identifying the plurality of fetch portions and one or more operations.

12. The system of claim 10, wherein the memory is further configured to:
check requested data identified in the plurality of fetch returns for one or more faults based on an error correction code implemented by the memory.

13. The system of claim 10, wherein the memory is further configured to:
generate the check bit based on an error correction code implemented by the memory.

14. The system of claim 13, wherein the error correction code implemented by the memory comprises an on-die error correction code.

15. The system of claim 10, wherein a first number of the fetch returns are received at the processing device on a first pseudo channel of the memory and a second number of the fetch returns are received at the processing device on a second pseudo channel of the memory.

16. The system of claim 10, wherein the memory comprises a three-dimensional stacked synchronous dynamic random-access memory.

17. A method comprising:
generating, at a processing device, a check value for each write portion of a plurality of write portions based on an error correction code implemented by the processing device, each write portion of the plurality of write portions identifying a respective portion of data to be written to a memory;
determining a write parity based on the respective portions of data to be written to the memory of each write portion of the plurality of write portions and an operation; and
sending, to the memory, the write portions, check values, and write parity.

18. The method of claim 17, wherein the memory comprises a three-dimensional stacked synchronous dynamic random-access memory.

19. The method of claim 17, wherein a first number of the write portions are sent to the memory on a first pseudo channel of the memory and a second number of the write portions are sent to the memory on a second pseudo channel of the memory.

20. The method of claim 17, wherein the error correction code comprises a cyclic redundancy check code.

* * * * *